Nov. 29, 1938.  O. RASMUSSEN ET AL  2,138,206
SLACK ADJUSTER
Filed May 28, 1936

Inventors
Olaf Rasmussen &
Richard C. Rike
By Blackmore, Spencer & Flint
Attorneys Patented Nov. 29, 1938

2,138,206

UNITED STATES PATENT OFFICE 2,138,206

SLACK ADJUSTER

Olaf Rasmussen and Richard C. Rike, Dayton, Ohio, assignors to General Motors Corporation, Detroit, Mich., a corporation of Delaware Application May 28, 1936, Serial No. 82,207

1 Claim. (Cl. 188—79.5)

This invention relates to brakes, and has been designed to automatically take up excessive clearances between the drum and shoes of a hydraulically operated vehicle brake.

An object of the invention is to provide means to take up excessive clearances by mechanism suitably housed within the so-called wheel cylinder of the hydraulic brake system.

Another object is to provide such an adjustment superimposed upon a predetermined lost motion connection in the applying means designed to ensure a necessary degree of shoe clearance.

Other objects comprise the accomplishment of the major objects by mechanism which shall be simple, easy to install, efficient in operation and comparatively inexpensive.

The invention is illustrated on an accompanying drawing in which Fig. 1 is a transverse section through a brake drum and wheel cylinder.

Figure 1:
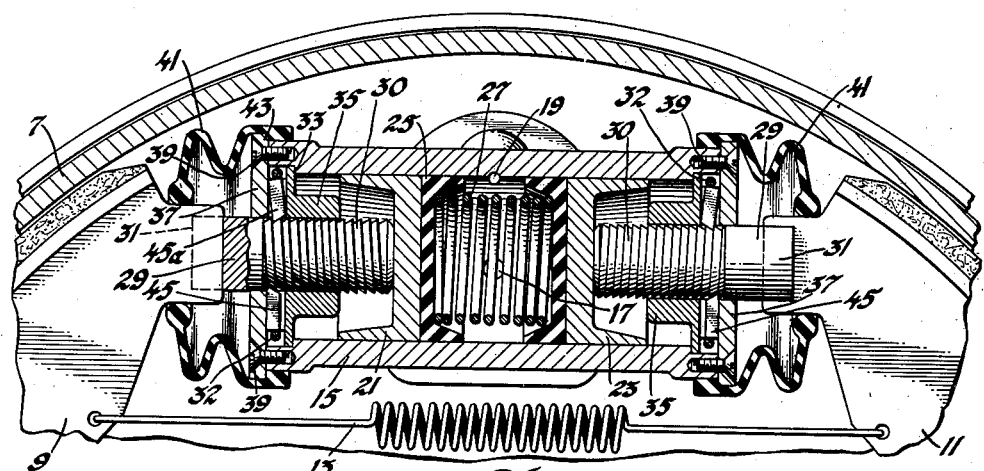

Referring by reference characters to the drawing, numeral 7 is used to designate a conventional brake drum. To frictionally engage the drum there are shown two shoes 9 and 11 normally held from drum contact by a releasing spring 13.

Suitably supported as by the backing plate or cover for drum 7 is a wheel cylinder 15. Fluid is admitted through an opening 17 to an intermediate part of the cylinder by means of a conduit such as 18 (see Fig. 4) from a master cylinder, not shown. At 19 is an air bleed hole which is normally closed by a plug 20 (see Fig. 4). Within the cylinders are pistons 21 and 23 provided with sealing cups 25. Between the pistons there may be a spring 27.

Axial members or plungers 29 have bifurcated heads 31 embracing the webs of shoes 9 and 11. Externally each plunger is provided with a helical ratchet tooth formation 30. The plungers engage the pistons and the spring 13 functions to push the plungers and pistons to brake release position—the position shown. The cylinder adjacent each end is formed with a shoulder 33 engaged by a radially extended part of a pawl retainer 35. The retainer is held against the shoulder by a cover 37 secured by screws or the like 39. A dust guard 41 preferably of rubber is held to the cylinder adjacent an extension 43 of the cover and grips the end of the shoe. Within the retainer and partly positioned by the cover 37 are a plurality of radially directed pawls 45, their teeth engaging the ratchet device 30. A suitable spring 32 serves to project the pawls into the position shown. It will be noted that since the ratchet formation is helical and since the pawls are circumferentially spaced they engage at slightly different positions axially of the plunger, this being permitted by the spaced relation of the walls of the retainer and cover, thereby permitting slightly changed positions of the pawls. Successive ones of the pawls may thus act to grip the plunger and engage the retainer wall to effect a finer adjustment than would be possible with a single pawl.

The operation of the mechanism is as follows: It may be assumed that Fig. 1 shows the parts in brake release position. The upper pawl (marked 45a, to distinguish it from the other, marked 45) contacts the retainer wall, its tooth being engaged in the ratchet. It thus limits the release movement of the shoe and plunger 29. At the same time pawl 45 lies against the cover 37 and is not holding the plunger from inward movement. The fluid entering at 17 moves the piston 21 (and also 23) toward the end of the shoe. The shoe is moved to contact the drum by means of plunger 29. If the lining is not worn appreciably the movement of the plunger will cause the tooth of the lower pawl 45 to slide toward but not over the top of the cooperating ratchet tooth. At the same time tooth of the other pawl remains at the bottom of the ratchet as the pawl moves toward a position corresponding to that shown by 45. It is during this movement of pawl 45a from the position shown to a position like that of 45 in Fig. 1 that the shoe clearance necessary to accommodate changes in the drum is taken up. The lining wear may be such that the tooth of pawl 45 jumps over a ratchet tooth. If so, upon the return of the plunger, pawl 45 may move to the right sufficiently to engage the wall of the retainer 35 and hold the plunger. There is thus afforded a fixed dimension lost motion to accommodate drum changes, and there is also provided a finer adjustment than would be the case if circular teeth were cut on the plunger or if but a single pawl were used with a helical groove. Obviously more than two pawls may be used if still finer adjustment be needed. Still another advantage results from the use of a helical groove. When the lining is replaced it is possible to release plunger 29 from the shoe and, merely by rotating it, to relocate the pawls toward the bifurcated end of the plunger. It is not necessary to provide any means to lift the pawl as would be the case with a circular groove.

By the location within the cylinder and by means of the protection afforded by the boot, the self-adjusting expedient is fully protected from foreign matter and manual adjustment is not required throughout the life of the lining.

Figure 2:
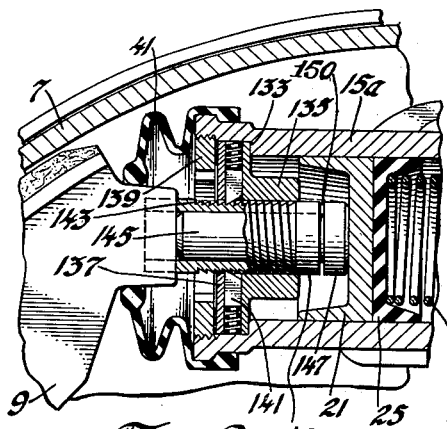
Figs. 2 and 3 are similar sections of modified forms.

In Fig. 2 is shown a somewhat modified form. In this embodiment the drum and shoe are designated by the same reference characters as are used in Fig. 1. The same piston 21 slides in a slightly modified cylinder 15a. Into the cylinder 15a is inserted a retainer 135 to engage a shoulder 133. A disc 137 closes a chamber within the retainer and the assembly is held in position by a nut 139 threaded into the end of the cylinder. The pawls are marked 141 and are projected into engagement with the helical toothed periphery of a sleeve-like ratchet 143. The end of the ratchet sleeve is bifurcated and embraces the web of the shoe. Reciprocable within ratchet sleeve 143 is a plunger 145 operably engaging the shoe web and having a head 147 to contact with the piston 21. It will be noted that when both the ratchet and the plunger engage the shoe web as they do when the brake is released, the length of the plunger is such that the head 147 is spaced slightly from the adjacent end 148 of the ratchet sleeve. The pawls act in sequence in determining the release position because of the helical character of the ratchet. The space 150 between the head 147 and the ratchet sleeve is made sufficient to provide a necessary clearance between the drum and shoes. Such a clearance is required to accommodate drum changes such as may be caused by heat or distortion under the influence of pressure. When the head 21 is moved by the piston the opposite end pushes the shoe and spaces the shoe from the ratchet sleeve. When the head engages and moves the ratchet sleeve the pawls may or may not determine a new retracted position of the shoe dependent upon the condition of the lining. Since the end of the plunger has moved the shoe from contact with the ratchet sleeve, the plunger will return sufficiently to develop a spaced relation between the shoe and drum, equivalent to the illustrated space between the head 21 and the ratchet sleeve, before the ratchet sleeve engages and stops the release movement of the shoe. Sufficient shoe clearance is thus ensured to accommodate contraction of the drum as it cools and restoration from any distortion which may have been imparted to it in the act of brake application.

The number of the pawls determines the fineness of the adjustment for correcting lining wear. This form of the invention is believed to possess especial merit in that there is a predetermined spacing between the plunger and ratchet sleeve to accommodate drum changes regardless of the variable position of the ratchet sleeve due to lining wear.

Figure 3:
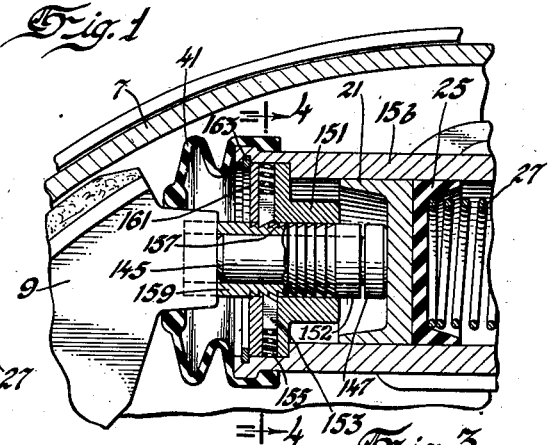
Figure 4:
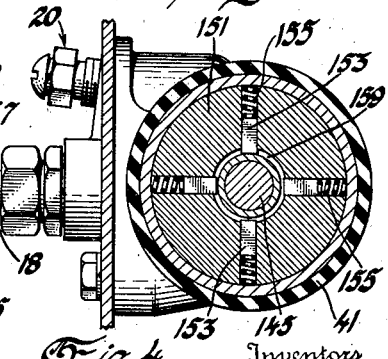
Fig. 4 is a section on line 4—4 of Fig. 3.

In Fig. 3 is a modification employing the same drum, shoes and piston. Cylinder 15b has a pawl retainer 151 carrying a plurality of axially spaced pawls 153 projected by springs 155 into contact with circular ratchet teeth 157 on a ratchet sleeve 159. A plate 161 and snap ring 163 position the parts. The axial spacing of the pawls and the circular (instead of helical) ratchet teeth are to secure the fine adjustment. Fig. 4 shows that there may be four of these pawls. Here, as before, the spacing of the head 147 of plunger 145 from the end 152 of the ratchet sleeve 159 is for the purpose of accommodating changes in drum contour, the pawl and ratchet functioning solely to accommodate lining wear.

Figure 5:
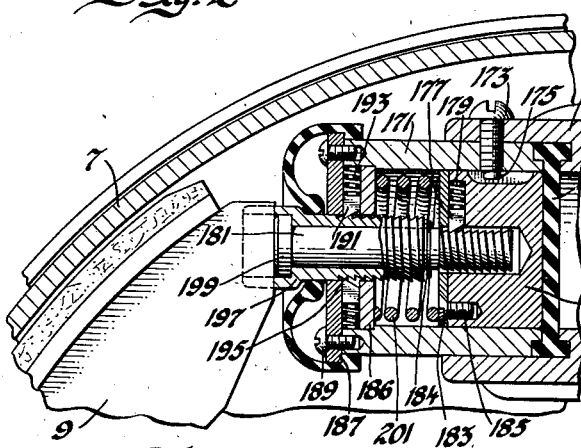
Fig. 5 is a similar section of still another embodiment.

In some hydraulic brake wheel cylinders there is used a piston seal secured peripherally to the cylinder, in which cases it is not expedient that the piston assume new positions of adjustment outward toward the end of the cylinder for changes in lining wear. Fig. 5 shows an adaptation of our invention for a wheel cylinder having such a piston seal. In this figure the drum 7 and shoe 9 are like those of the other embodiments. The piston 165 is advanced by an expansible seal, seal 167 being representative of that type which is anchored to the cylinder instead of slidable with the piston. The seal is secured peripherally in the junction of the central part 169 of the cylinder and an end part thereof marked 171. Screw means 173 is shown as securing together parts 171 to 169 and its extended end 175 is received in a notch of the piston 165 to guide the latter. The piston is provided with pawls 177 projected radially by springs 179 to engage a helical ratchet formation on a plunger 181. A closure 183 secured by screws 185 positions the pawls. Carried by the plunger is a fixed ring 184 for a purpose to be explained. A disc 186 is held against a shoulder near the end of part 171. An end closure 187 is secured by fastening means 189. Between parts 186 and 187 are pawls 191 projected by springs 193 to engage a helical ratchet formation 195 on the outer surface of ratchet sleeve 197. Sleeve 197 is bifurcated to straddle and, in brake release position, to engage the web of shoe 9 along with the head 199 of the plunger 181 which is mounted to reciprocate through the ratchet sleeve. It will be seen that when both the bifurcated end of the ratchet sleeve 197 and the head 199 of the plunger contact with the shoe web, the ring 184 is spaced slightly from the end of the ratchet sleeve. Between the disc 183 and the part 186 is a coil spring 201. The operation is as follows: Fluid admitted behind the seal 167 bulges the seal to a convex form and the piston 165 is advanced. Since the pawls lock the plunger to the piston for this direction of movement, the plunger 181 is advanced and the shoe is moved to contact the drum. After a limited movement, ring 184 engages the end of the ratchet 197 and if there has been an appreciable lining wear one of the pawls 191 may jump over the ratchet tooth and determine a new position of release for the shoe, ratchet sleeve and plunger 181. It will be clear that changes in drum contour are provided for by the always fixed spacing between the inner end of ratchet sleeve 197 and the plunger ring 184. In the event of ratchet adjustment the piston 165 would not return to its original position unless added provision be made to this end. In the forms described above, the piston did assume new positions. In those cases, however, the seal moves with the piston and since the reservoir could be relied on to supply the additional fluid required by the new position of the piston, no disadvantage results. When, however, the seal is carried by the cylinder, the piston should return to the same initial position after each brake application. In the modification shown by Fig. 5, this can occur after the brake has been released. Spring 201 acts to push the piston 165 back to its original position, the pawl 177 merely traversing the ratchet teeth of the plunger. The pawl is then available to enable the piston at the beginning of its movement to initiate the movement of the plunger. It will be understood that this expedient may be used with a conventional seal as in the other figures, but it is of especial use with such seals as those typified by diaphragm 167 of Fig. 5.

We claim:

In brake mechanism, a rotatable member, a shoe adapted to engage the rotatable member and retard its rotation, brake applying means comprising a cylinder, a piston element therein, motion transmitting means between said piston element and shoe, said transmitting means including a reciprocable member having a plurality of axially displaced circumferentially disposed teeth, a plurality of pawls carried by the cylinder and spaced circumferentially, said pawls being disposed axially relative to each other, and yielding means pressing said pawls radially toward said teeth.

OLAF RASMUSSEN.
RICHARD C. RIKE.